United States Patent [19]

Arai et al.

[11] Patent Number: 5,234,563
[45] Date of Patent: Aug. 10, 1993

[54] ELECTROLYTIC IONIZED WATER PRODUCER OF A CONTINUOUS TYPE

[75] Inventors: Kazuyoshi Arai, Atsugi; Kazuhiro Miyamae, Machida; Shinji Abe, Sagamihara, all of Japan

[73] Assignee: Janix Kabushiki Kaisha, Japan

[21] Appl. No.: 890,792

[22] Filed: Jun. 1, 1992

[51] Int. Cl.$^5$ .................. C25B 9/00; C25B 15/02; C25B 15/08
[52] U.S. Cl. .................................. 204/229; 204/263
[58] Field of Search .............................. 204/229, 263

[56] References Cited

U.S. PATENT DOCUMENTS

| | | | |
|---|---|---|---|
| 4,572,775 | 2/1986 | Paniagua | 204/229 |
| 4,810,344 | 3/1989 | Okazaki | 204/229 X |
| 4,917,782 | 4/1990 | Davies | 204/229 X |
| 5,051,161 | 9/1991 | Yamaguchi et al. | 204/229 |
| 5,062,940 | 11/1991 | Davies | 204/229 X |

FOREIGN PATENT DOCUMENTS 62-273096 11/1987 Japan .

*Primary Examiner*—Donald R. Valentine
*Attorney, Agent, or Firm*—Lorusso & Loud

[57] ABSTRACT

An electrolytic ionized water producer of a continuous type is disclosed which does not require users to perform complicated operations and which makes it possible to obtain ionized water easily with a simple operation, to remove the fear of obtaining unnecessary ionized water in the case of reversing polarity and, further, to maintain a stable electrolyzing capability for a long time while removing scale in an optimum way in every water supplying operation. Specifically, the electrolytic ionized water producer is provided with a control circuit which operates at least a polarity reversing relay provided in a circuit for applying a DC voltage to a positive electrode and a negative electrode, detects water supply and zero flow water supply with a signal from a flow rate sensor and applies a DC voltage to the respective electrodes at a normal connection position when water is supplied to produce ionized water, sets a scale removing period of time corresponding to a water supplying period of time corresponding to integrated signals from the flow rate sensor, and applies a DC voltage to the respective electrodes at a reverse connection position only for a set period of time of scale removing operation in every water supplying operation.

4 Claims, 3 Drawing Sheets

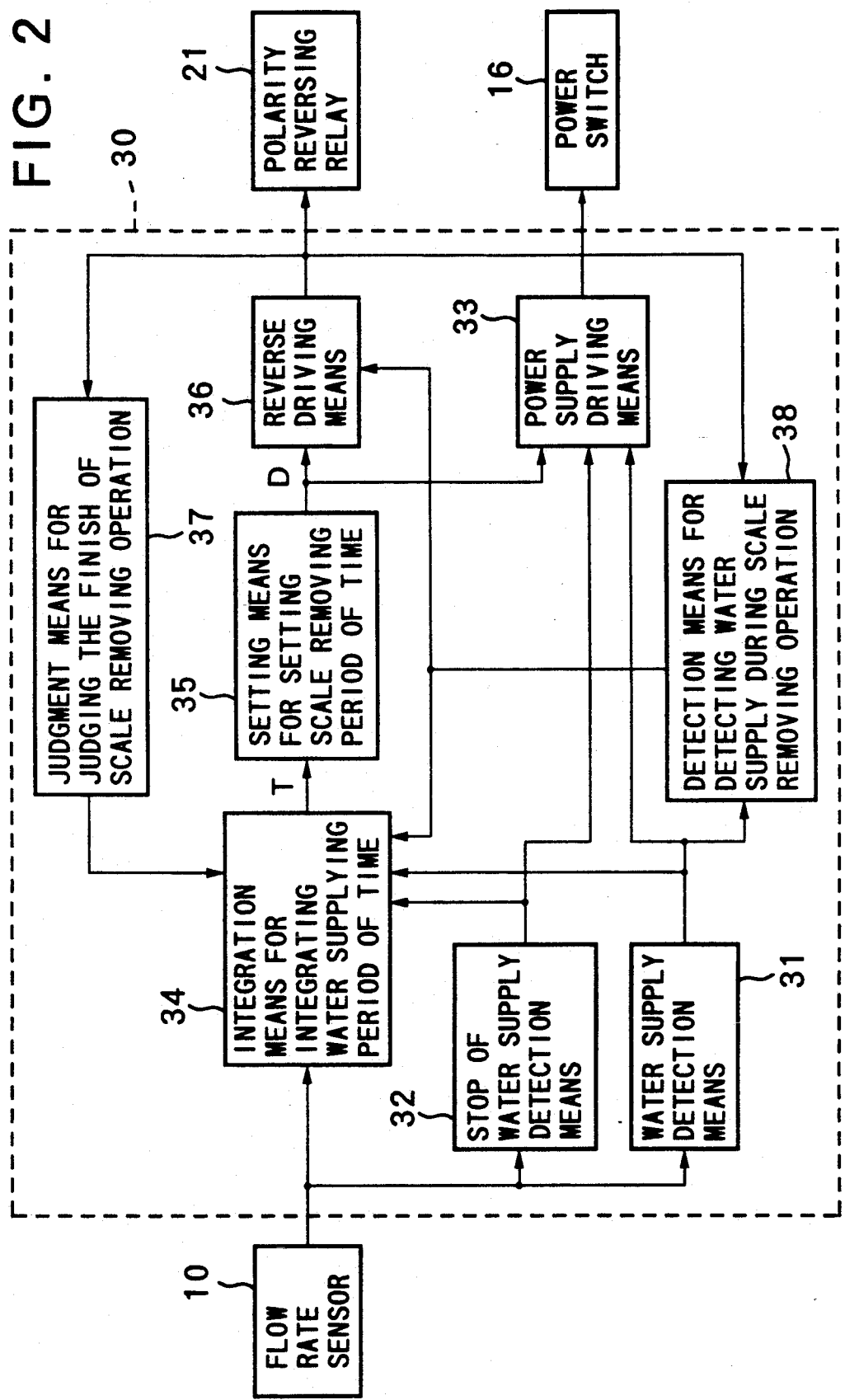

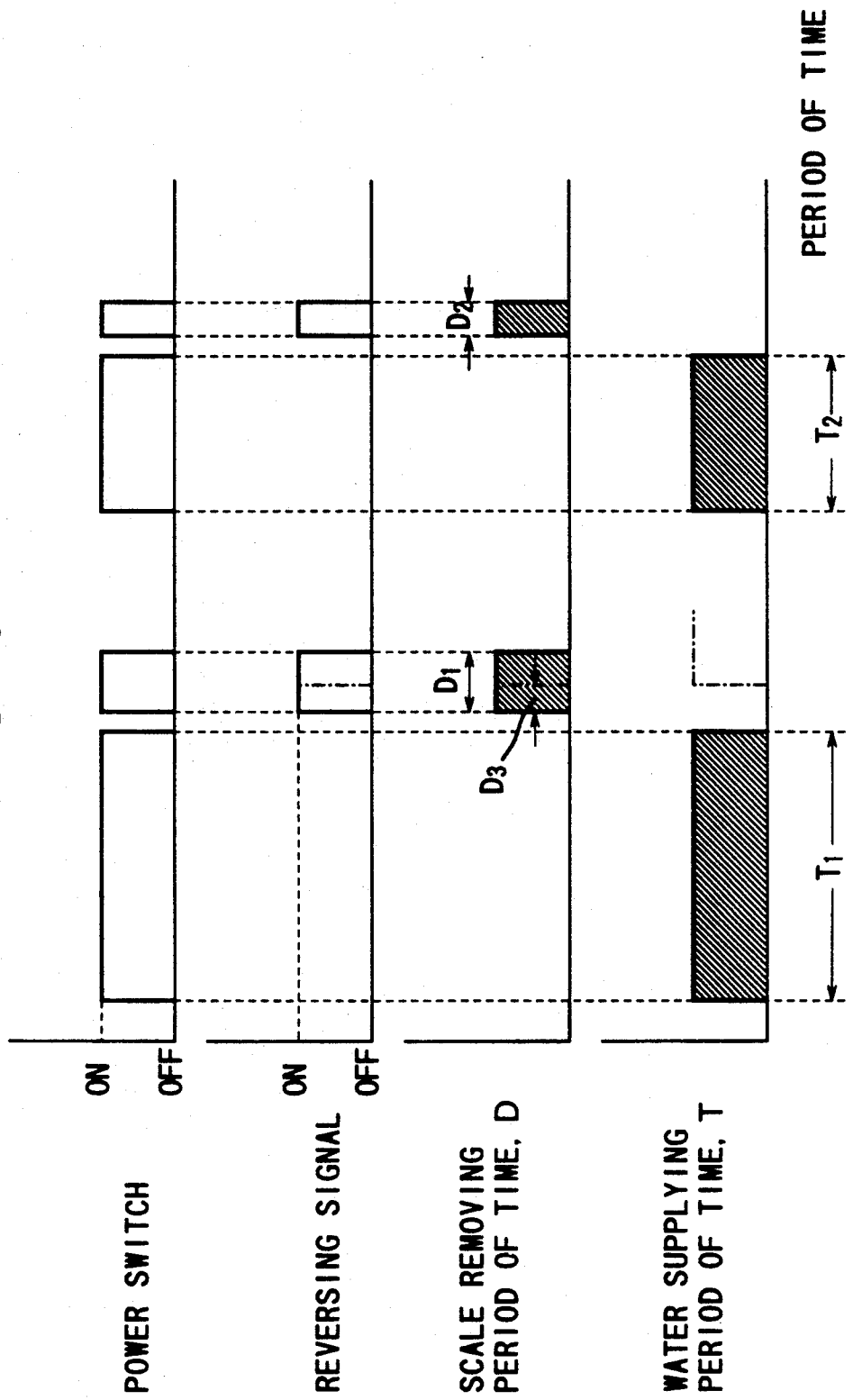

ELECTROLYTIC IONIZED WATER PRODUCER OF A CONTINUOUS TYPE

BACKGROUND OF THE INVENTION

1. Field of the Invention

The present invention relates to a continuous type electrolytic ionized water producer which continuously produces alkaline ionized water and acid ionized water by electrolyzing city water; in particular, it relates to a rinse means which automatically removes scale which sticks on the electrodes used for electrolysis.

2. Description of the Prior Art

The body fluid which accounts for 70% of a human body is similar to the alkaline water which has dissolving power for excreting ejecta in the intestines. Acidic water has sterilizing capability. Use of an electrolytic ionized water producer as a medical substance producer is known to the public and makes it possible to produce alkaline ionized water and acid ionized water directly from drinking water by electrolyzing the water by applying a DC voltage to the positive and negative electrodes. Drinking the alkaline ionized water promotes the health of the people of the present day by improving their acid constitutions caused by their meat eating habits. The acidic ionized water may be utilized as toilet lotion for cleaning the body surfaces.

In an electrolytic ionized water producer, it is necessary to electrolyze flowing water continuously and large sized electrodes are used accordingly; the impurities of positive ions of calcium, magnesium, and so on contained in the water are deposited on a negative electrode as scale. The quantity of the scale increases with the increase in the quantity of water or the period of time, and when the quantity of scale reaches a certain level, the electrolyzing ability is extremely reduced and the electrode itself becomes corroded. In order to remove the scale coated on the electrodes, the polarity of a negative electrode on which scale is coated is switched to positive to dissolve the scale into the water for rinsing away. In accordance with the above-mentioned phenomenon, an electrolytic ionized water producer of the continuous type is offered in which scale is automatically removed by periodical reversal of polarity in which electrolytic operation can be continuous.

As a conventional electrolytic ionized water producer of a continuous type, there is a prior art example disclosed in Japanese Patent laid open No. 273096/87. The ionized water producer according to the prior art comprises an electrolytic bath with electrodes, a pressure switch which is operated by water pressure generated by flow of water into the electrolytic bath, and a control circuit having a voltage application means for applying a DC voltage with a specified polarity corresponding to the operation of the pressure switch. The control circuit reverses the polarity of the DC voltage applied to the electrodes when the integrated period of time of water flow reaches a value which corresponds to a specified quantity of water, and continues the application of the voltage until the pressure switch is turned OFF, after which the polarity of the voltage is returned to its original polarity.

In the case of conventional apparatus, when scale is being removed, if the energizing period of time in the reverse polarity is too short, a sufficient rinse is not performed, and if the period of time is too long the scale can adhere to the other electrode causing a reverse effect, so that a specified total quantity of water to be supplied is set, and when the quantity of water reaches the set value, even while water is being supplied, the polarity of the applied voltage is reversed for scale removing operation, and the water supply is stopped issuing an alarm to the user. Therefore, even when a small quantity of water is needed, the user is required to perform a complicated operation such as to stop supplying water once and after that to start supplying water again. Since the polarity is automatically reversed while water is being supplied, if the operation is stopped late, acid ionized water generated by the reversal of polarity is mixed with the alkaline ionized water. The reverse energizing period of time for the reversal of polarity depends on the period of time till a user stops using water, so that it is difficult to secure a fixed period of time for reverse energizing operation. Therefore, trouble can occur caused by the uncertain period of time for reverse energizing operation. There can be another problem that since the ionized water producer is provided with a pressure switch as a means for integrating the quantity of water, and an alarm means, and so on the configuration can be a complicated one.

SUMMARY OF THE INVENTION

It is therefore an object of the present invention to provide an ionized water producer in which complicated operation is not needed, there is no fear of obtaining unnecessary ionized water during the reversal of polarity and the ease of obtaining ionized water is upgraded and, in every operation of supplying water, scale is properly removed to secure a high electrolyzing ability for a long period of time.

In order to achieve the above-mentioned object, an ionized water producer according to the present invention comprises a water supply detection means provided along the pipeline supplying water to an electrolytic bath having a positive electrode and a negative electrode, and a control circuit which operates a relay for reversing the DC voltage polarity to be applied to the negative electrode and the positive electrode. The control circuit comprises a means for detecting water supply or the absence of water supply with a signal from the water supply detection means, and for applying a DC voltage to the positive electrode and the negative electrode at a normal connection position when water is supplied, and a means for setting a scale removing period of time corresponding to the water supplying period of time. The detected water supplying period of time is represented by a signal from the water supply detection means. The control circuit also applies a DC voltage to the positive electrode and the negative electrode in a reverse connecting position only for a period of time of scale removing operation corresponding to the water supplying period of time.

In the above-described system, when water is supplied to the electrolytic bath, the water supply is detected by the control circuit as a signal from a flow rate sensor, and a DC voltage is applied to the positive electrode and the negative electrode in the normal connection position, and ionized water is produced. At this time in the control circuit, a water supplying period of time is totalized from the signals from the flow rate sensor and the period of time for removing scale is set accordingly. In every operation of supplying water, only for the period of time set for removing scale, a DC voltage is applied to the positive electrode and the negative electrode at a reverse connection position; thus, scale can be removed properly in every water supplying operation.

BRIEF DESCRIPTION OF THE DRAWINGS

Other features and advantages of the invention will be apparent from the following description taken in connection with the accompanying drawing wherein:

FIG. 2 is a block diagram showing a control system of an embodiment of a continuous type electrolytic ionized water producer according to the present invention; and FIG. 3 is a chart showing the time chart of the operation of ionized water production and the scale removing operation.

DETAILED DESCRIPTION OF PREFERRED EMBODIMENT

Figure 1:
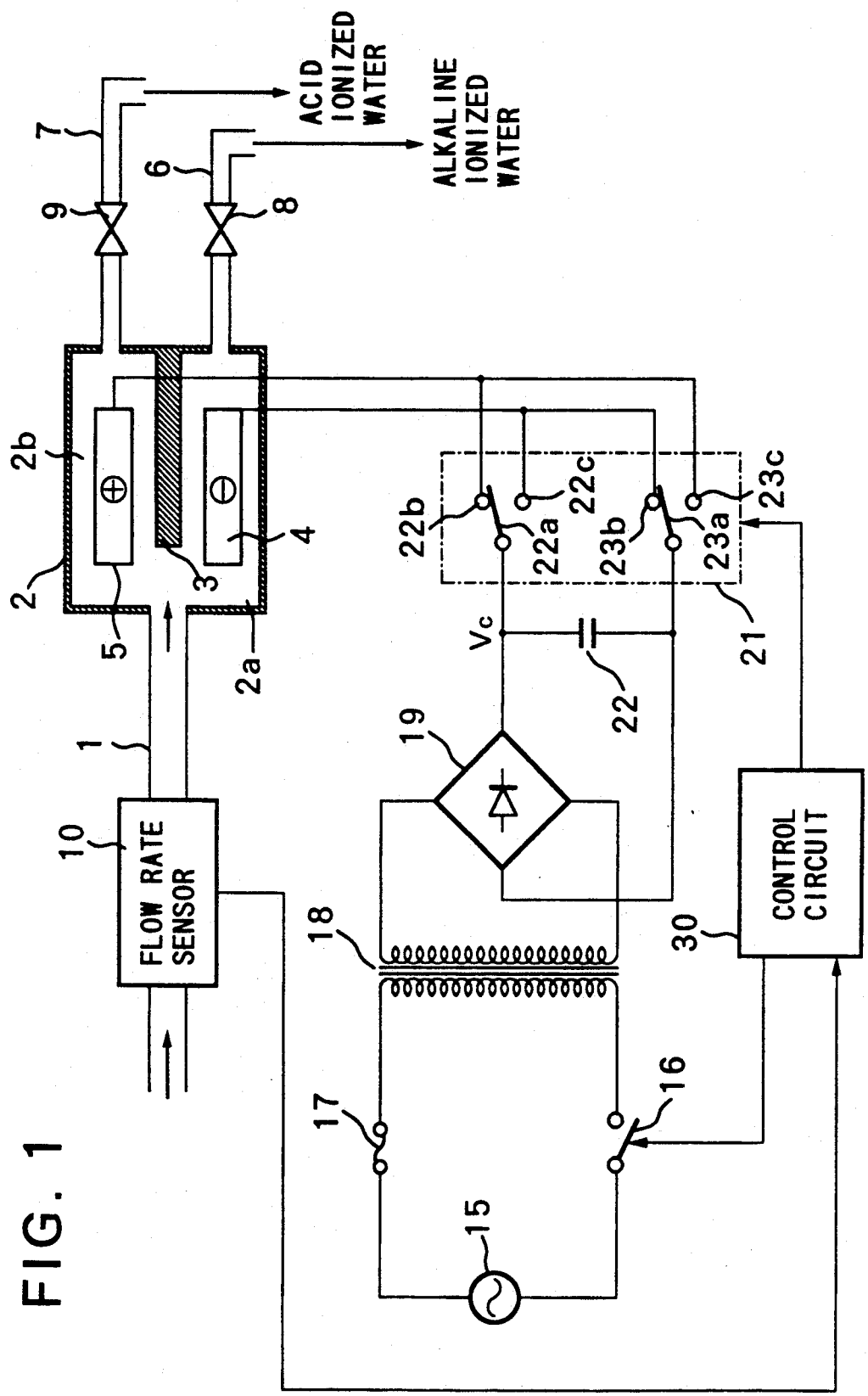
FIG. 1 is a schematic representation showing the outline of the whole system of an embodiment of a continuous type electrolytic ionized water producer according to the present invention.

An embodiment according to the present invention will be explained based on the drawings in the following. The outline of the whole of a continuous type electrolytic ionized water producer will be explained based on FIG. 1. In FIG. 1, 1 is an inlet pipe for introducing drinking water being connected to a city water supply and the inlet pipe 1 is connected to an electrolytic bath 2. The electrolytic bath 2 is of a closed type, and the interior of the bath is partitioned into 2 compartments, 2a and 2b by a partition 3, and the compartments house negative electrode 4 and a positive electrode 5, respectively. A discharge pipe 6 for alkaline ionized water is provided in communication with the compartment 2a having the negative electrode 4, and a discharge pipe 7 for acid ionized water is provided in communication with the compartment 2b having the positive electrode 5. Each of these discharge pipes, 6 and 7, is provided with a faucet, 8 or 9, which makes it possible to take off alkaline ionized water or acid ionized water separately. The inlet pipe 1 is provided with a flow rate sensor 10 for detecting water supply or water supplying period of time of alkaline ionized water or acid ionized water. The flow rate sensor 10 has, for example, rotatable impellers fixed with magnet pieces which produce a pulse signal, and the pulse signal is processed electrically for detecting water flow and the period of time of water flow. An electric control system for applying a voltage will be explained in the following. 15 is an AC power source, and it is connected to the primary side of a transformer 18 through a power switch 16, which is ON or OFF responsive to an output signal of a control circuit 30, and a fuse 17, and the secondary side of the transformer 18 is connected to a rectifier circuit 19. A positive electrode and a negative electrode on the DC voltage output side of the rectifier circuit 19 are connected to 2 movable contacts, 22a and 23a, of a relay 21 for reversing polarity through a smoothing capacitor 20. A fixed contact 22b, which is 1 of 2 fixed contacts, 22b and 22c, of the movable contact 22a of the positive electrode is connected to the positive electrode 5, and the other fixed contact 22c is connected to the negative electrode 4. A fixed contact 23b, which is 1 of 2 fixed contacts, 23b and 23c, of the movable contact 23a of the negative electrode is connected to the negative electrode 4 and the other fixed contact 23c is connected to the positive electrode 5. These 2 movable contacts, 22a and 23a, normally abut the fixed contacts 22b and 23b, as shown in the drawing, under the force of a spring, and they are switched to the reverse connecting positions abutting the opposed fixed contacts, 22c and 23c, by a reversing signal from the control circuit 30.

The control system of the control circuit 30 will be explained based on FIG. 2. The control circuit 30 comprises a water supply detection means 31, a zero flow water supply detection means 32 and an integration means for integrating the water supplying period of time 34, to which signals from the flow rate sensor 10 are input. The water supply detection means 31 detects a water supply when a signal from the flow rate sensor 10 is input continuously for a fixed time, and the water supply detection means 32 detects stop of water supply when a signal from the flow rate sensor 10 has stopped inputting continuously for a fixed time. These detection signals of water supply and zero flow water supply are input to a power supply driving means 33 which outputs a signal for making the power supply switch 16 ON during the water supply.

An integration means for integrating the water supplying period of time 34 inputs to the memory the water supply integrated quantity, for the period of time from the input of a water supply detection signal till the input of a zero flow water supply detection signal, and counts the number of pulses in the signal from the flow rate sensor 10, and totalizes and stores a water supplying period of time, T, corresponding to the water supply quantity for all water supplying operations. A signal representative of the water supplying period of time, T, is input to a setting means for setting a scale removing period of time 35 at the start of zero flow water supply, and a scale removing period of time, D, is set corresponding to the water supplying period of time, T. When the water supplying period of time, T, is long, much scale is produced, and the scale removing time, D, becomes long, so that the scale removing time, D, is optimized for every water supplying operation, approximately in the form of a growth function, for the water supplying period of time, T, and the scale removing period of time, D, is set using a setting map. A signal representative of the scale removing period of time, D, is input to a reverse driving means 36 which outputs a reversing signal only for the period of time, D, to the polarity reversing relay 21 for switching the connection to a reverse connection position. A signal for scale removing period of time, D, is also input to the power supply driving means 33 and, only for the period of time D, it outputs an ON signal to the power supply switch 16. The above-mentioned reversing signal is input to a judgment means for determining the conclusion of a scale removal operation 37, and when the reversing signal is stopped inputting continuously for a specified period of time, it judges the conclusion of scale removing operation, and a finishing signal is input to the water supplying period of time integration means 34 and the memory is reset.

On the other hand, as a measure for the case where water is supplied during a scale removing operation, the control circuit 30 comprises a detection means for detecting water supply during a scale removing operation 38 in which a water supply detection signal from the water supply detection means 31 and a reversing signal from the judgment means for judging the finish of a scale removing operation 37 are input, and if a water supply detection signal is input during a period of time in which a reversing signal is being output, a signal for water supply during a scale removing operation is generated. A signal from the water supply detection means during a scale removing operation 38 is input to the reverse driving means 36 to stop the output of a reversing signal, and at the same time the signal is input to the water supplying period of time integration means 34 to reset the memory.

Next, the operation of the embodiment will be explained using the time chart shown in FIG. 3. Drinking water is always introduced from the city water supply to the electrolytic bath 2 through an inlet pipe 1, and a signal from the flow rate sensor 10 is not input to the control circuit 30 in a state where the faucets, 8 and 9, fixed to the discharge pipes, 6 and 7, of alkaline ionized water and acid ionized water are closed, that is, in an unused state. Therefore, the polarity reversing relay 21 is at a normal connection position, however, the power switch 16 switched OFF, so that power is not supplied and electrolysis is not performed. When the faucet 8 of the discharge pipe 6 is opened, for example, water is supplied from the inlet pipe 1 to the electrolytic bath 2 and a pulse signal from the flow rate sensor 10 is input to the control circuit 30, and water supply is detected with the water supply detection means 31, and the power supply switch 16 is switched ON by a power supply driving means 33. Then the output voltage of an AC power supply 15 is applied to the primary side of a transformer 18 and the secondary output voltage is rectified to a DC voltage by a rectifier circuit 19 and the DC voltage is smoothed with a smoothing capacitor 20, and the specified DC voltage, Vc, is in a ready state. At this time, since the polarity reversing relay 21 is at the normal connection position, the positive electrode of the DC voltage, Vc, is connected to the positive electrode 5 and the negative electrode of the DC voltage, Vc, is connected to the negative electrode 4, that is, the voltage is applied in a normal way, and the drinking water in the electrolytic bath 2 is electrolyzed. On the side of the positive electrode 5 acid ionized water containing many negative ions is obtained and on the side of the negative electrode 4 alkaline ionized water containing many positive ions is obtained, and the alkaline ionized water is obtained at the faucet 8. After that, when the faucet 8 is closed, the water supply is stopped and the signal from the flow rate sensor 10 stops accordingly, and the zero flow water supply is detected by the zero flow water supply detection means 32, and the power supply switch 16 is switched OFF to stop the production of ionized water by electrolysis.

When the electrolysis of water continues for a length of time, the water supply period of time, $T_1$, is integrated by the water supplying period of time integration means 34 as shown in FIG. 3, and an optimum scale removing time, $D_1$, is set corresponding to the water supplying period of time, $T_1$, by a scale removal time setting means 35. A reversing signal is output from a reverse driving means 36 to the polarity reversing relay 21 only for the scale removing period of time, $D_1$, to change the connection from a normal connection position to a reverse connection position and, at the same time, the power supply switch 16 is switched ON again for supplying power. In this case, electrolysis is performed in a state of reverse power supply in which the negative electrode of the DC voltage, Vc, is connected to the positive electrode 5 and the positive electrode of the DC voltage, °C., is connected to the negative electrode 4; thereby, the scale adhered to the positive electrode 5 and the negative electrode 4 is dissolved into water and removed properly in the supply of water.

When the scale removing operation is judged to have finished by the judgment means for judging the conclusion of a scale removing operation 37, the integrating operation by the integration means for integrating water supplying period of time 34 is reset for the preparation of the next integrating operation. In this case, if the water supplying period of time, T, is as small as $T_2$ as shown in FIG. 3, the scale removing period of time, D, also becomes so small as $D_2$; in this way, scale is automatically removed corresponding to the adhesive condition of the scale, utilizing a vacant time right after every water supplying operation.

In order to make scale removing operation possible when water is not being supplied, the water supply path is configured to keep water inside the electrolytic bath 2 for more than a fixed period of time after the supply of water is stopped.

In the scale removing period of time, D, the supply of water is detected by the detection means for detecting the water supply during a scale removing operation 38. When water is supplied during the scale removing period of time, $D_1$ as shown with a one-dot chain line in FIG. 3, the integration means for integrating water supply period of time 34 is reset and a new integration of water supplying period of time T is started, the output of a reversing signal is stopped, the polarity reversing relay 21 is returned to a normal connecting position and electrolysis is performed normally to produce ionized water. The desired ionized water can be obtained immediately without waiting. In this case, originally, the scale removing period of time, D, is decreased from $D_1$ to $D_3$ and the scale removing operation may be insufficient; however, there occurs no problem because the scale can be dissolved in the subsequent scale removing operations.

While one embodiment according to the present invention has been described above, the present invention is not limited to that embodiment. For example, the polarity reversing relay 21 can be arranged to perform ON/OFF operation besides the switching of normal/reverse connection positions, or a switch in addition to the power switch 16 can be added. A configuration, for example, is also possible in which an alarm is given during a scale removing operation and water supply is allowed only after the removal of scale. Although the invention has been described in its preferred form with a certain degree of particularity, it is understood that the described preferred embodiment may be changed in its details of construction and the combination and arrangement of parts may be altered without departing from the spirit and the scope of the invention as hereinafter claimed.

What is claimed is:

1. An electrolytic apparatus for the production of ionized water, said apparatus comprising:
   an electrolytic cell, including a positive electrode and a negative electrode, for producing ionized water;
   inlet and outlet means for feeding a water flow through said electrolytic cell;
   valve means associated with said outlet means for starting and stopping said water flow;
   a flow sensor for detecting said water flow and for emitting a flow signal over a time period during which said water flow continues;
   integrating means for totalizing the said flow signal to obtain a running total time for the time periods of continuing water flow;

supply means for applying a DC voltage to said positive and negative electrodes responsive to said detection of water flow;

setting means for setting a scale removing time period corresponding to said running total;

switching means for switching the DC voltage supplied to said electrolytic cell between a first polarity position providing for water ionization and a second polarity position providing for scale removal from said electrodes;

power supply control means for switching said switching means to said second polarity position and starting said supply means to supply said DC voltage for scale removal, responsive to cessation of said flow signal, and for stopping said supply of power responsive to lapse of said set scale removal time period.

2. An electrolytic apparatus in accordance with claim 1 wherein said valve means comprises at least one manually operable faucet.

3. An electrolytic apparatus in accordance with claim 2 wherein said electrolytic cell is divided into two compartments containing, respectively, said positive electrode and said negative electrode and wherein said outlet means includes a separate outlet for each of said compartments and said valve means includes a manually operable faucet on each of the separate outlets, whereby acid ionized water can be obtained at one separate outlet and alkaline ionized water can be obtained at the other separate outlet.

4. An electrolytic apparatus in accordance with claim 1 wherein said control circuit stops the scale removing operation when the control circuit detects new water supply during the scale removing operation, and the control circuit resumes the integrating operation for the new water supply.

* * * * *